United States Patent
Yamada et al.

(10) Patent No.: US 9,208,803 B2
(45) Date of Patent: Dec. 8, 2015

(54) MAGNETIC HEAD, MAGNETIC HEAD ASSEMBLY, AND MAGNETIC RECORDING APPARATUS

(71) Applicant: KABUSHIKI KAISHA TOSHIBA, Tokyo (JP)

(72) Inventors: Kenichiro Yamada, Tokyo (JP); Hitoshi Iwasaki, Tokyo (JP); Masayuki Takagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/592,405

(22) Filed: Jan. 8, 2015

(65) Prior Publication Data

US 2015/0269955 A1   Sep. 24, 2015

(30) Foreign Application Priority Data

Mar. 24, 2014   (JP) ................... 2014-060688

(51) Int. Cl.
*G11B 5/39* (2006.01)

(52) U.S. Cl.
CPC .................... *G11B 5/3903* (2013.01)

(58) Field of Classification Search
CPC ........ B82Y 25/00; H01L 43/08; H01L 43/12; H01L 29/66984; H01L 27/222; H01L 27/224; G11C 11/16; G11C 11/15; G11B 5/3909; G11B 5/3903; G11B 5/3906; G11B 2005/3996
USPC ............ 360/313, 324–324.2; 438/3; 257/E21.665, 40, 421; 365/158, 171, 365/173; 428/811.1
See application file for complete search history.

(56) References Cited

U.S. PATENT DOCUMENTS

| | | | | |
|---|---|---|---|---|
| 5,898,548 | A | * | 4/1999 | Dill et al. .................. 360/324.2 |
| 2003/0030099 | A1 | * | 2/2003 | Hsieh et al. .................. 257/315 |
| 2003/0112564 | A1 | * | 6/2003 | Granstrom ............... 360/324.12 |
| 2006/0152158 | A1 | * | 7/2006 | Lee et al. ...................... 313/586 |
| 2007/0082230 | A1 | * | 4/2007 | Shi et al. ........................ 428/811 |
| 2008/0152952 | A1 | * | 6/2008 | Santos et al. ............... 428/811.1 |
| 2009/0011284 | A1 | * | 1/2009 | Wang et al. ................. 428/847.2 |
| 2013/0100724 | A1 | | 4/2013 | Venkataraman et al. |
| 2013/0299786 | A1 | * | 11/2013 | Shi et al. ......................... 257/40 |

OTHER PUBLICATIONS

Santos T S et al: "Room-temperature tunnel magnetoresistance and spin-polarized tunneling through an organic semiconductor barrier", Physical Review Letters, American Physical Society, New York, US, vol. 98, No. 1, Jan. 5, 2007, pp. 16601/1-4.*
Raman et al., "Interface-engineered templates for molecular spin memory devices," Nature (Jan. 24, 2013), 493:509-513.

* cited by examiner

*Primary Examiner* — Will J Klimowicz
(74) *Attorney, Agent, or Firm* — Finnegan, Henderson, Farabow, Garrett & Dunner, L.L.P.

(57) ABSTRACT

A magnetic head includes a first electrode layer, a metal magnetic layer, an organic molecular having a pi conjugated structure, an inorganic layer, and a second electrode layer.

15 Claims, 7 Drawing Sheets

FIG. 1B
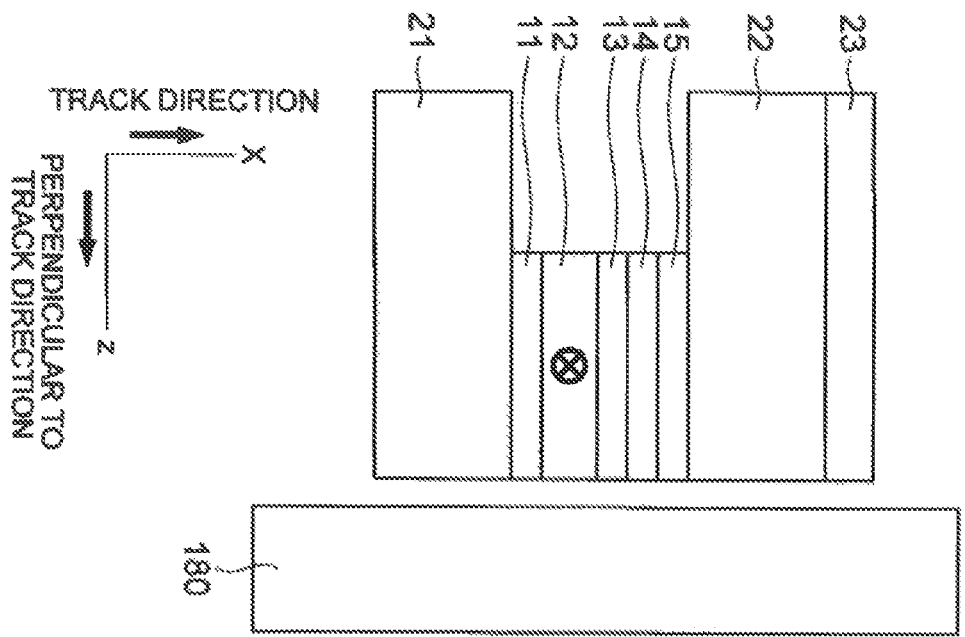
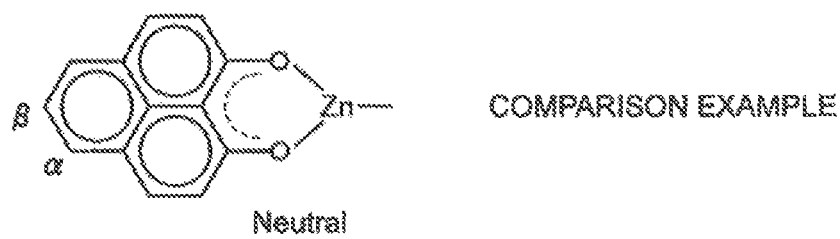
FIG. 2A  COMPARISON EXAMPLE
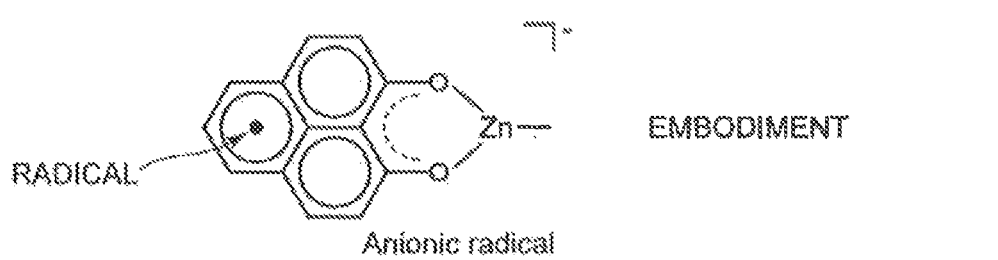
FIG. 2B  EMBODIMENT

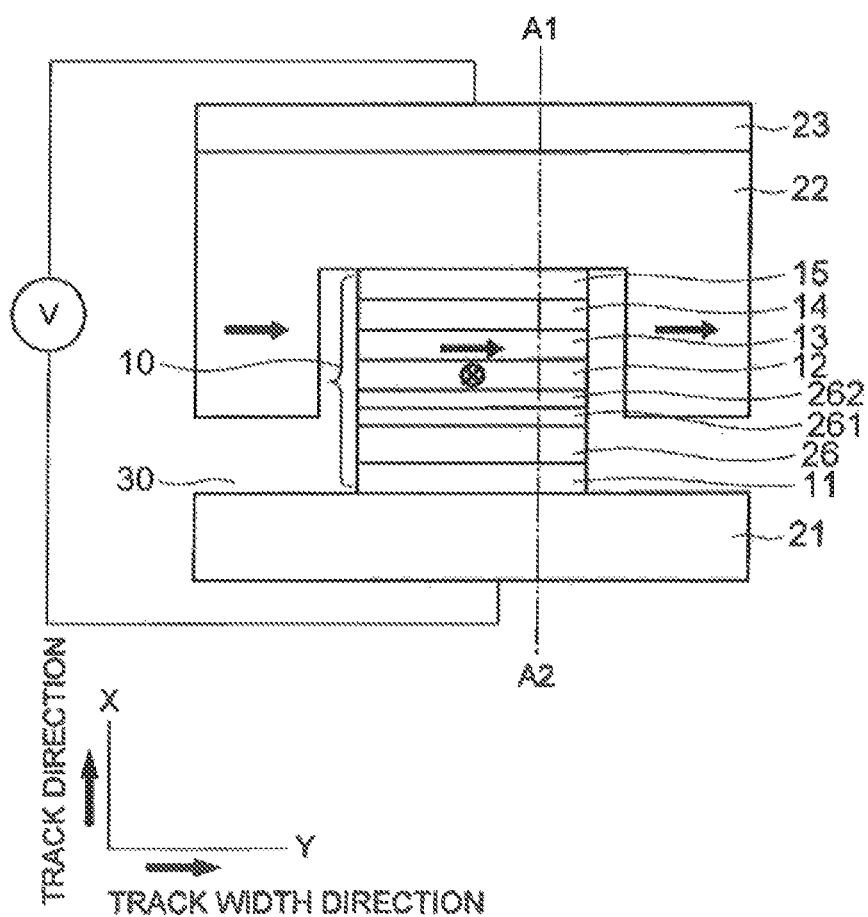

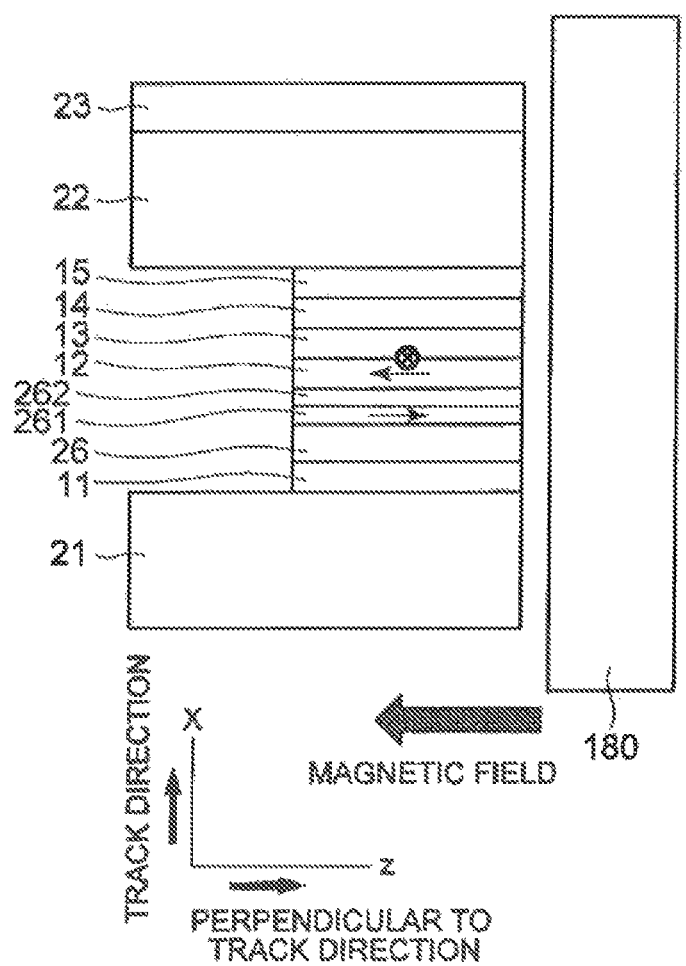

FIG. 4

| | Band gap(eV) | RA(mΩ $\mu$ um$^2$) |
|---|---|---|
| MgO | 7.4 | >0.4 |
| MgAlO | 4.04 | - |
| SrTiO3 | 3.91 | - |
| ZrO | 4~5 | - |
| HfO | 4~5 | - |
| MgTiO | - | RA~0.165 |
| GaO | - | RA~0.1 |
| ZnO (SEMICONDUCTOR) | - | RA~0.2 |

FIG. 5

| | UNDER LAYER 11 | METAL MAGNETIC LAYER 12 | ORGANIC MOLECULAR LAYER 13 | INORGANIC LAYER 14 | CAP LAYER 15 | MR RATIO | RA($\mu\Omega$ cm$^2$) |
|---|---|---|---|---|---|---|---|
| WORKING EXAMPLE | Ta(2)/Cu(2) | CoFeMnSi(4)/Co(1) | ZMP(3 MONOLAYERS) | MgTiO(1) | Ru(2)/Ta(2) | 66% | 0.22 |
| | Ta(2)/Cu(2) | CoFeMnSi(4)/Co(1) | ZMP(3 MONOLAYERS) | HfO(1) | Ru(2)/Ta(2) | 51% | 0.33 |
| | Ta(2)/Cu(2) | CoFeMnSi(4)/Co(1) | ZMP(3 MONOLAYERS) | GaO(1) | Ru(2)/Ta(2) | 55% | 0.16 |
| | Ta(2)/Cu(2) | CoFeMnSi(4)/Co(1) | ZMP(3 MONOLAYERS) | MgTiO(1.3) | Ru(2)/Ta(2) | 60% | 0.35 |
| | Ta(2)/Cu(2) | CoFeMnSi(4)/Co(1) | ZMP(3 MONOLAYERS) | MgTiO(2) | Ru(2)/Ta(2) | 61% | 0.6 |
| | Ta(2)/Cu(2) | Co(5) | ZMP(3 MONOLAYERS) | MgTiO(1) | Ru(2)/Ta(2) | 10% | 0.25 |
| | Ta(2)/Cu(2) | CoFe(5) | ZMP(3 MONOLAYERS) | MgTiO(1) | Ru(2)/Ta(2) | 20% | 0.19 |
| | - | - | - | - | - | - | - |
| COMPARISON EXAMPLE | Ta(2)/Cu(2) | CoFeMnSi(4)/Co(1) | ZMP(3 MONOLAYERS) | - | Ru(2)/Ta(2) | 0% | 0.07 |

_US 9,208,803 B2_

MAGNETIC HEAD, MAGNETIC HEAD ASSEMBLY, AND MAGNETIC RECORDING APPARATUS

CROSS-REFERENCE TO RELATED APPLICATION

This application is based upon and claims the benefit of priority from Japanese Patent Application No. 2014-60688, filed Mar. 24, 2014; the entire contents of which are incorporated herein by reference.

FIELD

Embodiments described herein relate to a magnetic head, a magnetic head assembly, and a magnetic recording apparatus.

BACKGROUND

In a magnetic recording apparatus of a hard disk device, information recorded in a magnetic media (hard disk) is read by a magnetoresistance type magnetic head.

The recent years, recording density of information in the magnetic media has increased and a recording bit has become small. For this reason, in order to read the information recorded by the small recording bit, it has been necessarily develop a magnetic head using a magnetic sensor (signal reproducing part) having a minimum possible thickness.

DESCRIPTION OF THE DRAWINGS

FIG. 1B is a cross-sectional diagram of a magnetic sensor of a magnetic head according to a the first embodiment;

FIG. 2A is a diagram showing a pi conjugation electron structure of an organic molecule layer related to an embodiment;

FIG. 2B is a diagram for showing a pi conjugation electron structure of an organic molecule layer related to an embodiment;

FIG. 3A is a cross-sectional diagram of the magnetic sensor of a magnetic head according to a second embodiment;

FIG. 3B is a cross-sectional diagram of the magnetic sensor of a magnetic head according to a second embodiment;

FIG. 4 is a diagram for showing a band gap or an area resistance RA of an inorganic layer;

FIG. 5 is a diagram for showing a MR ratio and the area resistance when a magnetic sensor includes the inorganic layer according to the magnetic sensor of an embodiment;

DETAILED DESCRIPTION

Figure 1A:
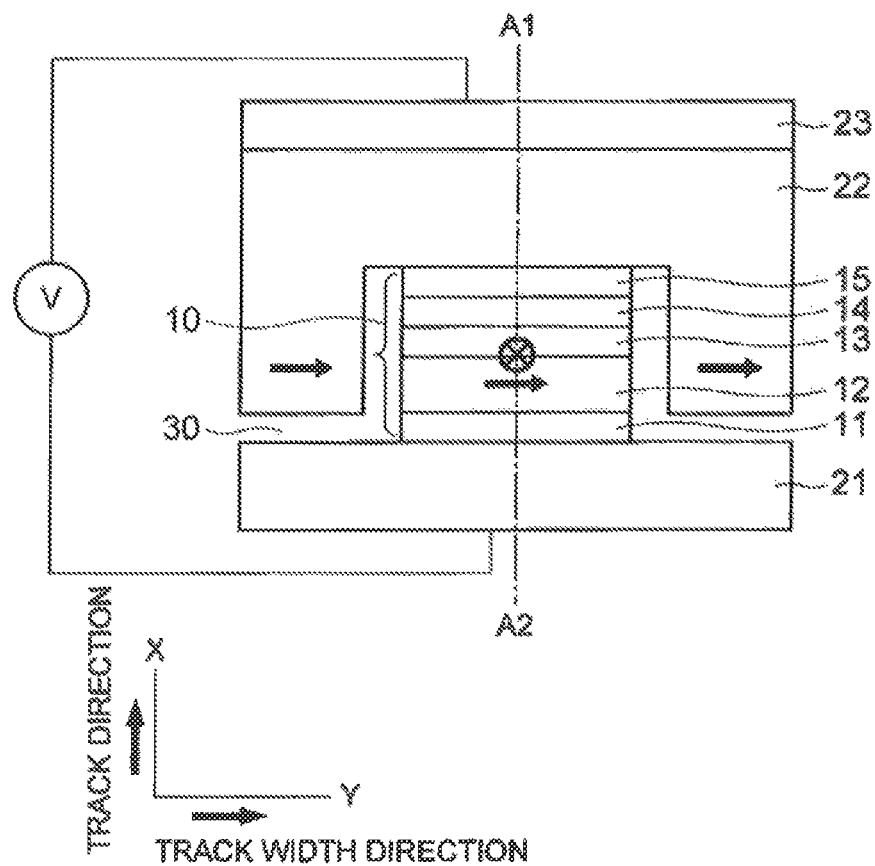
FIG. 1A is a cross-sectional diagram of a magnetic sensor of a magnetic head according to a first embodiment.

Hereinafter, with reference to the accompanying drawings, embodiments will be described. What is given the same reference numeral indicates the same component. It is noted that the drawings are schematic or conceptual and that a relationship between a thickness and a width of each portion and a ratio coefficient of sizes between the portions are not necessarily the same as those of actual things. Moreover, even when the same portion is shown, there is also a case where it is shown with different sizes and ratio coefficients depending on the drawings, A first embodiment will be explained with reference to the figures below.

[First Embodiment]

FIGS. 1A and 1B are cross-sectional diagrams of a magnetic sensor of a magnetic head according to a first embodiment of this invention.

FIG. 1A shows the magnetic sensor of the magnetic head facing a magnetic recording medium 180 (FIG. 1B).

FIG. 1B shows a cross-sectional diagram corresponding to A1-A2 shown in FIG. 1A. The magnetic sensor reads data recorded in the magnetic recording medium 180.

A recording part recording data into the magnetic recording medium 180 is laminated on an upper part or an under part of the magnetic sensor (not shown). The magnetic head includes the magnetic sensor and the recording part.

A composition and operation of the magnetic sensor related to the first embodiment will be explained with reference to FIGS. 1A and 1B.

As shown in FIGS. 1A and 1B, the magnetic sensor of the magnetic head has a laminated film (magnetoresistance (MR) film)) 10 for generating a magnetoresistance effect, and magnetic metal electrode layers (magnetic shield) 21, 22 which also serve a magnetic shield function.

The MR film 10 has an under layer 11, a metal magnetic layer 12, an organic molecule layer 13, an inorganic nonmagnetic layer (inorganic layer) 14 having a hand gap of a semiconductor or insulation, and a cap layer 15.

A nonmagnetic metal such as Ta, Ru, or Cu is used for the under layer 11. A thickness of the under layer 11 is several nanometers.

A laminating film laminating a plurality of materials can be used for the under layer 11. A laminating film such as Ta/Cu can be used for the under layer 11.

Co, an alloy related to FeCo, or ordered Heusler alloy can be used for the metal magnetic layer 12. The ordered Heusler alloy is CoFeMnSi, CoFeGaGe, CoMnSi, or CoFeAlSi.

The metal magnetic layer 12 has a large spin polarization. The metal magnetic layer 12 can generate magnetism at an interface when the metal magnetic layer 12 is laminated with the organic molecular layer 13.

About 1 nm thickness Co layer can be provided at the interface between the organic molecular layer 13 and the metal magnetic layer 12. The ordered Heusler alloy can be provided at an interface between the metal magnetic layer 12 and the under layer 11.

An output of a reproducing signal can be obtained because a magnetization of the metal magnetic layer 12 is changed by a magnetic field from the magnetic recording medium 180.

The metal magnetic layer 12 can be a low coercive force He and a low magnetostriction in order to obtain a linear magnetization response for reading the magnetic recording medium 180 at high SN ratio. In order to realize this, the metal magnetic layer 12 can be laminated with NiFe alloy.

The thickness of the metal magnetic layer 12 can be almost the same as a thickness of a free layer of a conventional magnetic head. For example, the thickness of the metal magnetic layer 12 can be about 5 nm.

An organic molecule having a pi conjugation electron structure is used for the organic molecular layer 13.

FIG. 2 shows an example of the pi conjugation electron structure.

Here, Zinc Methyl phenalenyl (ZMP, $C_{14}H_{10}O_2Zn$) is used for the organic molecular layer 13 as shown in United States Patent Publication No. US2013/0100724.

The pi conjugation electron structure in which Zn is replaced Zn by other metals based on phenalenyl can be used for the organic molecular layer 13.

As shown in FIG. 2A, generally the organic molecular layer 13 is nonmagnetic when the organic molecular layer 13 is not laminated with the metal magnetic layer 12.

However, as explained in this embodiment, a part of the organic molecular layer 13 changes into radical state, and the part of the organic molecular layer 13 generates magnetism by exchanging electrons via the interface between the organic molecular layer 13 and the metal magnetic layer 12 as shown in FIG. 2B when the organic molecular layer 13 is laminated with the metal magnetic layer 12. This phenomenon is called induced surface magnetism.

A magnetization induced by magnetism of the organic molecular layer 13 has a large magnetic anisotropy and retains stable magnetization even if the organic molecular layer 13 is an ultrathin layer like a monomolecular layer.

The magnetoresistance effect is lost when the thin organic molecular layer 13 (no more than 10 nm) is used to realize the magnetic sensor (not more than 20 nm) which is thin and low resistance. However, the magnetic sensor can obtain large magnetoresistance effect when the inorganic layer 14 consisting of oxide or nitride is formed between the organic molecular layer 13 having several nanometers thickness and a metal cap layer (the cap layer) 15.

The inorganic layer 14 has a minimum possible thickness in order to realize low resistance. For example, the thickness of the inorganic layer 14 is about 1 nm. It is difficult to realize low resistance if the thickness of the inorganic layer 14 is over 2 nm. An oxide having small band gap energy or small barrier high energy can be used for the inorganic layer 14.

FIG. 4 is a diagram for showing a band gap or an area resistance RA of the inorganic layer 14 related to this embodiment.

Here, a material has smaller band gap energy or smaller barrier high energy than that of MgO used for a conventional magnetic sensor.

The material of the inorganic layer 14 can be, for example, GaO, ZnO, MgTiO, HfO, ZrO, MgAlO, or SrTiO.

These materials have substantially smaller area resistance than a critical value of the area resistance RA of MgO (0.4 $\mu\Omega m^2$). The band gap energy of these materials is small.

A conventional magnetic sensor generates a high MR ratio by use of spin filtering of MgO oxide. However, it is difficult for an oxide shown in FIG. 4 to realize the high MR ratio because the spin filtering effect is generally small.

The spin filtering effect generally means obtaining a spin polarized current by use of tunneling of ferromagnetic insulating material.

On the other hand, in this embodiment, the spin filtering effect generated between the metal magnetic layer 12 and the organic molecular layer 13 is used for the magnetic sensor. For this reason, the magnetic sensor can theoretically realize the high MR ratio even if it includes a low resistance inorganic layer 14.

The band gap energy of the organic molecular layer 13 is smaller than the band gap energy of the inorganic layer 14 in the case where the thickness of the organic molecular layer 13 is thin. For this reason, the inorganic layer 14 increases the resistance of the magnetic sensor. In the case where the inorganic layer 14 is not used for the magnetic sensor, about 30 nm thickness organic molecular layer 13 is used to obtain stable tunneling current.

However, the inventors found that stable tunneling current and large MR ratio could be realized by use of several monolayers of organic molecular layer 13 when the inorganic layer 14 was used for the magnetic sensor, as in this embodiment.

In order to reproduce high density data recorded in the hard disk, it is expected that ultrathin magnetic sensor which has no more than 20 nm thickness except for an upper and an under shield (for example, the magnetic shield layer 21, 22 in FIG. 1A, 1B) would be needed.

However, in order to realize the ultrathin magnetic sensor, for example, it is necessary to use the inorganic layer, 14 as explained in this embodiment, In the magnetic sensor having no more than 20 nm thickness as mentioned above, lower resistance than resistance of a current magnetic head using MgO (for example, the area resistance value is no more than 0.5 $\mu\Omega m^2$) can be realized when the organic molecular layer 13 and the inorganic layer 14 are used for the magnetic sensor, A thickness of the cap layer 15 is several nanometers. Nonmagnetic metal such as Ta, Ru, or Cu can be used for a material of the cap layer 15.

The upper magnetic shield 22 is provided over the metal magnetic layer 12 in a direction intersecting a laminating direction of the MR film 10 and a direction of the laminating direction of the MR film 10 as shown in FIG. 1A and 1B.

Around the MR film 10, an ultrathin oxide layer 30 (alumina or like) is provided between the upper magnetic shield 22 and the MR film 10 and between the magnetic shield 21 and the magnetic shield 22 in order to insulate these spaces.

In this embodiment, an antiferromagnetic bias layer 23 (IrMn or like) is provided on a part of the magnetic shield 22.

A method of arranging a magnetization of a magnetoresistance element in a preferable direction is explained next.

The preferable direction means that a magnetization of the induced surface magnetism generated in the part of the organic molecular layer 13 is in a same direction (height direction, z direction) as a magnetization of a media signal, and the magnetization of the metal magnetic layer 12 is in a direction (track width direction, y direction) intersecting the magnetic field from the recording medium 180

First, a case in which a disappearance temperature of the induced, surface magnetism is lower than a blocking temperature of the antiferromagnetic layer 23 will be explained.

A first heat treatment is performed in a magnetic field in the track width direction (y direction) at from 200 degree Celsius to 300 degree Celsius (at around a blocking temperature of the antiferromagnetic layer 23 or more).

By the first treatment, a magnetization of the magnetic shield 22 including a side part of the MR film 10 is fixed in the track width direction and a magnetization of the organic molecular layer 13 is fixed in the track width direction by a bias magnetic field from the side part of the magnetic shield 22.

A second heat treatment is performed in a magnetic field, in the height direction at a temperature which is lower than a temperature of the first heat treatment and higher than the disappearance temperature of the induced surface magnetism.

By the second treatment, the magnetization of the induced surface magnetism is fixed in the height direction (z direction) to be the same as a direction of a magnetic field of a media signal (a magnetic field that a signal is recorded in the magnetic recording medium 180).

In this embodiment, the first heat treatment is executed in the magnetic field in the track width direction at a temperature higher than the disappearance temperature of the induced surface magnetism. Furthermore, in a state that the magnetization of the metal magnetic layer 12 is fixed in the track width direction by use of the bias magnetic field from the magnetic shield 22, the second heat treatment is executed at a temperature such that a magnetic field direction of the magnetic shield 22 is not disturbed (at a heat treatment temperature at which the magnetization of the antiferromagnetic layer 23 is stable) and the induced surface magnetism disappears, in order to fix the magnetization of the induced surface magnetism in the height direction.

By these heat treatments, a magnetization of an interface magnetic layer that the part of the organic molecular layer 13 is changed (induced by the electron state change of the organic molecular layer 13) is fixed in one direction. The magnetization of the organic molecular layer 13 does not react with the magnetic field of the magnetic recording media 180 because it is fixed in a same direction or an opposite direction to the magnetic field of the magnetic recording media 180. At this time, the magnetic field of the magnetic recording media 180 is smaller than a coercive force of the organic molecular layer 13. The magnetization of the metal magnetic layer 12 can rotate depending on the magnetic field of the media signal because the magnetization of the metal magnetic layer 12 is fixed in a direction intersecting with the magnetic field of the media. A reproducing output from a resistance change depending on the magnetic field from the magnetic recording medium 180 can be obtained.

FIG. 5 is a diagram for showing MR effect generated with the inorganic layer 14 and an area resistance in a magnetic sensor related to an embodiment.

Here, the MR ratio and the area resistance HA of the magnetoresistance element relate to the embodiment corresponding to FIG. 1A and FIG. 1B.

As a comparison example, a case that the magnetic sensor does not comprise the inorganic layer 14 is also shown.

In the case that the magnetic sensor does not comprise the inorganic layer 14, for example, the MR does not generate even if three monolayers organic molecular layer 13 are used for the magnetic sensor (MR ratio 0%).

However, as shown in FIG. 5, the MR effect generates when the inorganic layer 14 is used for the magnetic sensor.

An example in which Ta(2)/Cu(2) is used for the under layer 11, CoFeMnSi(4)/Co(1) is used for the metal magnetic layer 12, ZMP(3) is used for the organic molecular layer 13, and Ru(2)/Ta(2) is used for the cap layer 15 will be explained. Parenthesis indicates the number of monolayer.

In the case that MgTiO(1) is used for the inorganic layer 14, the MR ratio is 66% and RA is 0.22 $\mu\Omega m^2$. In the case that MfO(1) is used for the inorganic layer 14, the MR ratio is 51% and RA is 0.33 $\mu\Omega m^2$. In the case that GaO(1) is used for the inorganic layer 14, the MR ratio is 55% and RA is 0.16 $\mu\Omega m^2$. In the case that MgTiO(1.3) is used for the inorganic layer 14, the MR ratio is 61% and RA is 0.35 $\mu\Omega m^2$. In the case that MgOTi(2) is used for the inorganic layer 14, the MR ratio is 60% and RA is 0.35 $\mu\Omega m^2$.

Next, an example that Ta(2)/Cu(2) is used for the under layer 11, ZMP(3) is used for the organic molecular layer 13, and Co(5) is used for the metal magnetic layer 12 will be explained. At this time, MgTiO(1) is used for the inorganic layer 14 and the MR ratio is 10% and RA is 0.25 $\mu\Omega m^2$.

Also, an example that Ta(2)/Cu(2) is used for the under layer 11, ZMP(3) is used for the organic molecular layer 13, Ru(2)/Ta(2) is used for the cap layer 15, and CoFe(5) is used for the metal magnetic layer 12 will be explained. At this time, MgTiO(1) is used for the inorganic layer 14, MR ratio is 20%, and RA is 0.19 $\mu\Omega m^2$.

A comparison example that Ta(2)/Cu(2) is used for the under layer 11, CoFeMnSi(4)/Cu(1) is used for the metal magnetic layer 12, ZMP(3) is used for the organic layer 13, and Ru(2)/Ta(2) is used for the cap layer 15 without the inorganic layer 14 will be explained. At this time, MR ratio is 0%, and RA is 0.07 $\mu\Omega m^2$.

In these examples, it is preferable that a thickness of the inorganic layer 14 is no more than 2 nm.

For example, in the case that MgTiO is used for the inorganic layer 14, RA is 0.6 $\mu\Omega m^2$ when the thickness of the inorganic layer 14 is 2 nm. For this reason, in a magnetic sensor having a 30 nm width that is necessary for reproducing recording density of 1 Tb/in$^2$, SN ratio decreases compared to an example of low RA.

According to the first embodiment, the magnetic head having a thin thickness MR film can be realized.

In the first embodiment, the magnetization of the metal magnetic layer 12 is arranged in a direction (track width direction in the magnetic head) intersecting the magnetic field without the magnetic field from the magnetic recording medium 180, and the magnetization of the metal magnetic layer 12 is changed by the magnetic field. Here the metal magnetic layer 12 works as a free layer.

[Second Embodiment]

FIGS. 3A and 3B are cross-sectional diagrams showing a magnetic sensor of the magnetic head 3 related to a second embodiment.

In this embodiment, an antiferromagnetic bias layer 26 of IrMn or the like, having a thickness of 5-7 nm, is provided between the metal magnetic layer 12 and the under layer 11. The antiferromagnetic bias layer 26 is used for applying an exchanged coupling magnetic field, also referred to herein as an exchanged bias magnetic field, to the metal magnetic layer 12.

In order to enhance a strength of the exchanged bias magnetic field, a magnetic layer 261 and a nonmagnetic layer 262 having an antiferromagnetic coupling function Ru or the like, having a thickness is not more than 1 nm, can be provided between the antiferromagnetic bias layer 26 and the organic molecular layer 13.

In this embodiment, the magnetization of the metal magnetic layer 12 is fixed so as not to be changed by the magnetic field from the magnetic recording medium 180.

The other compositions of the MR film 10 are basically the same in the magnetic sensor shown in FIG. 1A and FIG. 1B. The compositions of the magnetic shield 21, 22 are also the same in the magnetic sensor shown in FIG. 1A and FIG. 1B.

However, in this embodiment, magnetic field direction controlled by a heat treatment is different from in the magnetic sensor shown in FIG. 1A and FIG. 1B.

Here, the magnetization of the metal magnetic layer 12 is fixed in the height direction (Z), and the magnetization of the induced surface magnetism generated in the part of the organic molecular layer 13 is fixed in the track width direction (Y).

In the case where a disappearance temperature of the induced surface magnetism is higher than a blocking temperature of the antiferromagnetic bias layer 26, a heat treatment is performed in order to turn the magnetization of the organic molecular layer 13 to the track width direction (Y) (first heat treatment).

Another heat treatment is performed in order to turn a bias direction of the antiferromagnetic bias layer 26 into the height direction (Z) (second heat treatment).

In this case, it is preferable that the blocking temperature of the antiferromagnetic layer 23 is lower than the disappearance temperature of the induced surface magnetism.

In the case where the disappearance temperature of the induced surface magnetism is lower than the blocking temperature of the antiferromagnetic bias layer 26, a first heat treatment is performed in order to turn the bias direction of the anti ferromagnetic bias layer 26 to the height direction (Z). A second heat treatment is performed in order to turn the magnetization of the organic molecular layer 13 to the track width direction (Y) at a temperature lower than a temperature of the first heat treatment.

In this case, it if preferable that a blocking temperature of the antiferromagnetic layer 23 is higher than the disappearance temperature of the induced surface magnetism.

By using these magnetization arrangements, the magnetization of the metal magnetic layer 12 does not change and the magnetization of the organic molecular layer 13 changes depending on the magnetic field from the recording medium.

By using these compositions, in the magnetic sensor of the second embodiment, it is possibly to read a good signal with low SN ratio.

In the second embodiment, the magnetic sensor included means for applying a bias magnetic field. The magnetization of the metal magnetic layer 12 is fixed in a direction applying the magnetic field from the magnetic recording medium 180. It is preferable that the means for applying the bias magnetic field include the metal magnetic layer 12 laminated with the anti ferromagnetic layer 23 so that the magnetization of the metal magnetic layer 12 is fixed by the means for applying the bias magnetic field. Thus the means for applying the bias magnetic field is, for example, the antiferromagnetic layer 23.

By using these compositions, a thickness of the magnetic sensor can be thin, Thus, the magnetic head having a thin thickness MR film can be achieved.

Figure 6:
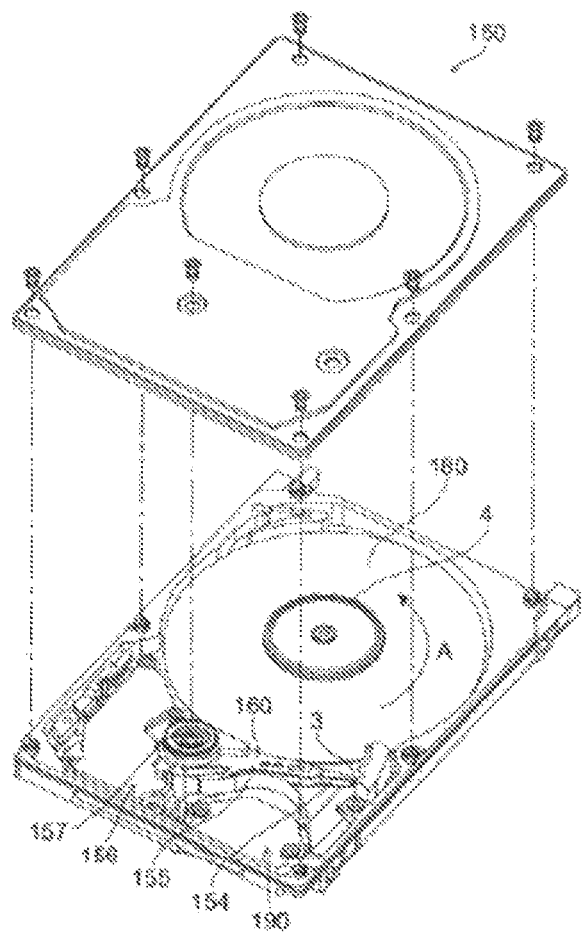
FIG. 6 is a diagram for showing a magnetic recording apparatus related to an embodiment.

FIG. 6 is a diagram for showing a magnetic recording apparatus 150 related to an embodiment.

In FIG. 6, the magnetic recording apparatus 150 is an apparatus including a rotary actuator. A recording medium disk 180 is mounted on a spindle motor 4 and rotated in the direction of arrow A by a motor, not shown, in response to a control signal from a drive controller, not shown. The magnetic recording apparatus 150 can include a plurality of recording medium disks 180.

When the recording medium disk 180 is rotated, the pressing pressure by a suspension 154 is balanced with the pressure generated at the medium facing surface (air bearing surface, ABS) of a head slider 3. Thus, the medium facing surface of the head slider 3 is held at a prescribed floating amount from the surface of the recording medium disk 180.

Figure 7A:
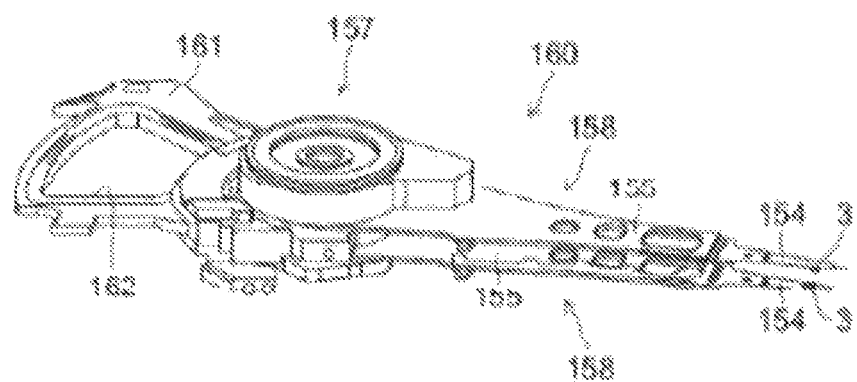
FIG. 7A is a diagram for showing a magnetic head assembly related to an embodiment.
Figure 7B:
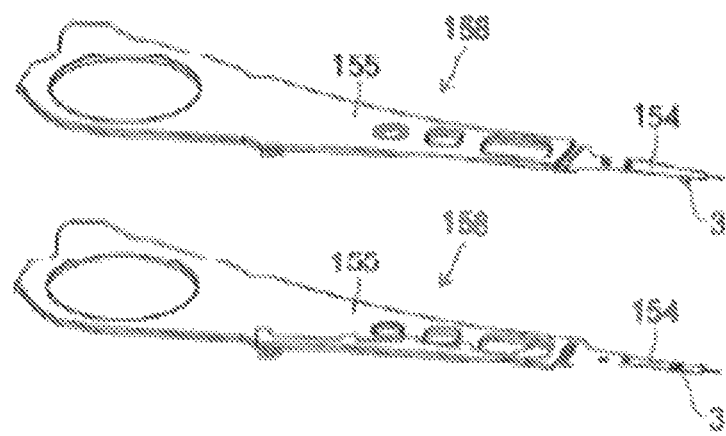
FIG. 7B is a diagram for showing a magnetic head assembly related to an embodiment.

FIG. 7A and FIG. 7B are diagrams for showing a magnetic head assembly 160 included in the magnetic recording apparatus 150.

As shown in FIG. 7A, the head stack assembly 160 includes a bearing portion 157, a head gimbal assembly 158 extending from this bearing portion 157, and a support frame 161 extending from the bearing portion 157 to the direction opposite from the head gimbal assembly 158 and supporting the coil 162 of the voice coil motor.

As shown FIG. 7B, the head gimbal assembly 158 includes an actuator arm 155 extending from the bearing portion 157, and a suspension 154 extending from the actuator arm 155.

The suspension 154 is connected to one end of an actuator arm 155 including a bobbin for holding a driving coil, not shown. A voice coil motor 156, which is a kind of linear motor, is provided on the other end of the actuator arm 155. The voice coil motor 156 can include of the driving coil, not shown, wound around the bobbin of the actuator arm 155, and a magnetic circuit including a permanent magnet and an opposed yoke opposed across the driving coil.

The actuator arm 155 is held by ball bearings, not shown, provided at two positions, top and bottom, of a bearing portion 157, so that the actuator arm 155 can be slidably rotated by the voice coil motor 156. Consequently, the magnetic recording head can be moved to an arbitrary position on the recording medium disk 180.

The organic molecular layer 13 of the magnetic head comprises phenalenyl.

The thickness of the organic molecular layer 13 of the magnetic head is not more than 3 nm.

The inorganic layer 14 comprises a material having an energy gap lower than an energy gap of MgO.

The magnetic head can include the metal magnetic layer 12 laminated with an antiferromagnetic layer in order to apply a bias magnetic field to the metal magnetic layer 12.

The metal magnetic layer 12 of the magnetic head includes a lamination of Heusler alloy and Co or CoFe alloy. The lamination enables reduction of a loss the induced surface magnetism because the other contents of Heusler alloy (for example, Si or Mn) are removed from around an interface between the metal magnetic layer 12 and the organic molecular layer 13.

By using the above structures, the magnetic head, magnetic head assembly, and the magnetic recording apparatus using the thin thickness magnetic sensor can be realized.

Although the exemplary embodiments of the present invention have been described above, these embodiments are presented just as examples, and it is not intended to limit a range of the invention. New embodiments may be carried out with other various modes, and a variety of omissions, replacements, and modifications may be made within a range that does not deviate from the invention, These embodiments and their modifications are included in the scope of the claims of the invention and their equivalents.

What is claimed is:

1. A magnetic head, comprising:
a first conductive layer being nonmagnetic;
a second conductive layer being nonmagnetic;
a metal magnetic layer provided between the first conductive layer and the second conductive layer;
an organic molecular layer provided between the metal magnetic layer and the second conductive layer, the organic molecular layer comprising a structure based on phenalenyl, the organic molecular layer having a magnetization; and
an inorganic layer provided between the organic molecular layer and the second conductive layer, the inorganic layer physically contacting the second conductive layer.

2. The magnetic head according to claim 1, further comprising:
an antiferromagnetic layer provided between the first conductive layer and the metal magnetic layer.

3. The magnetic head according to claim 2, wherein a thickness of the organic molecular layer is not more than 3 monolayers.

4. The magnetic head according to claim 2, wherein a thickness of the inorganic layer is no more than 2 nm.

5. The magnetic head according to of claim 2, wherein the inorganic layer comprises a material having band gap energy lower than a band gap energy of MgO.

6. The magnetic head according to claim 2, wherein the metal magnetic layer comprises Co or CoFe alloy at an interface between the metal magnetic layer and the organic molecular layer.

7. The magnetic head according to claim 1, wherein a thickness of the organic molecular layer is not more than 3 monolayers.

8. The magnetic head according to claim 1, wherein a thickness of the inorganic layer is no more than 2 nm.

9. The magnetic head according claim 1, wherein the inorganic layer comprises a material having a band gap energy lower than a band gap energy of MgO.

10. The magnetic head according to claim 1, wherein the metal magnetic layer comprises Co or CoFe alloy at an interface between the metal magnetic layer and the organic molecular layer.

11. A magnetic head assembly, comprising:
the magnetic head according to claim 1,
a suspension supporting the magnetic head; and
an actuator arm connected to the suspension.

12. A magnetic recording apparatus, comprising:
the magnetic head assembly according to claim 11; and
a hard disk to store data recorded by the magnetic head and to reproduce the data.

13. The magnetic head according to claim 1, wherein
the organic molecular layer has a part contacting the metal magnetic layer, and
the part has the magnetization.

14. A magnetic head, comprising:
a first conductive layer being nonmagnetic;
a second conductive layer being nonmagnetic;
a metal magnetic layer provided between the first conductive layer and the second conductive layer;
an organic molecular layer provided between the metal magnetic layer and the second conductive layer, the organic molecular layer including a pi bond in a conjugated system, and the organic molecular layer having a magnetization; and
an inorganic layer provided between the organic molecular layer and the second conductive layer, the inorganic layer physically contacting the second conductive layer.

15. The magnetic head according to claim 14, further comprising:
an antiferromagnetic layer provided between the first conductive layer and the metal magnetic layer.

* * * * *